United States Statutory Invention Registration [19]

[11] Reg. Number: H822

Nettleton et al. [43] Published: Sep. 4, 1990

[54] METHOD OF AMPLITUDE MODULATING A LASER BEAM

[76] Inventors: John E. Nettleton, 8106 Oak Hollow Ct., Fairfax Station, Va. 22039; Dallas N. Barr, 11974 William and Mary Cir., Woodbridge, Va. 22192

[21] Appl. No.: 344,723

[22] Filed: Apr. 28, 1989

[51] Int. Cl.[5] ..... H01S 3/00

[52] U.S. Cl. ..... 330/4.3; 372/27

[58] Field of Search ..... 332/7.51; 356/358, 370; 372/27

[56] References Cited

U.S. PATENT DOCUMENTS

| | | | |
|---|---|---|---|
| 3,958,863 | 5/1976 | Isaacs et al. | 332/7.51 |
| 4,217,036 | 8/1980 | Chang | 350/358 |
| 4,448,494 | 5/1984 | Freyre | 332/7.51 |
| 4,460,250 | 7/1984 | Freyre et al. | 350/358 |
| 4,793,676 | 12/1988 | Risk | 350/358 |

*Primary Examiner*—Thomas H. Tarcza

*Assistant Examiner*—Linda J. Wallace

[57] ABSTRACT

An acousto-optic tunable filter (AOTF), instead of being used for its intended use of frequency or wavelength tuning a laser from within its resonant cavity, is used outside the laser cavity to amplitude modulate the output beam of the laser. This is accomplished by directing the laser output beam into the AOTF and applying an A.C. voltage to a piezo-electric transducer which is a part of the AOTF.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF AMPLITUDE MODULATING A LASER BEAM

The invention described herein may be manufactured, used, and licensed by the U.S. Government for governmental purposes without the payment of any royalties thereon.

BACKGROUND OF INVENTION

This invention is in the field of amplitude modulators for laser beams. The known modulators run the gamut from variable density filters to acousto-optic (AO) and electro-optic (EO) devices. At present, insofar as response time and efficiency are concerned, AO and EO devices are preferred, although both are very lossy (20%–60%). Moreover, they each generate two output beams, such that even the beam power remaining after the internal losses is split in half. The present invention overcomes these disadvantages by the new of an old device to effect laser beam amplitude modulation. This old device is a colinear acousto-optic tunable filter.

SUMMARY OF THE INVENTION

This invention is a method of amplitude modulating a laser beam by the new use of an old device, specifically, an acoustic-optic tunable filter (AOTF). This AOTF consists of an anisotropic crystalline material such as thallium arsenic selenide ($TI_3AsSe_3$, or TAS for short) with a reflective interface and a piezo-electric transducer (PZT) affixed to one end of the TAS. A laser beam directed into the AOTF is amplitude modulated by an A.C. signal applied to the PZT.

DESCRIPTION OF PREFERRED EMBODIMENT

Figure 1:
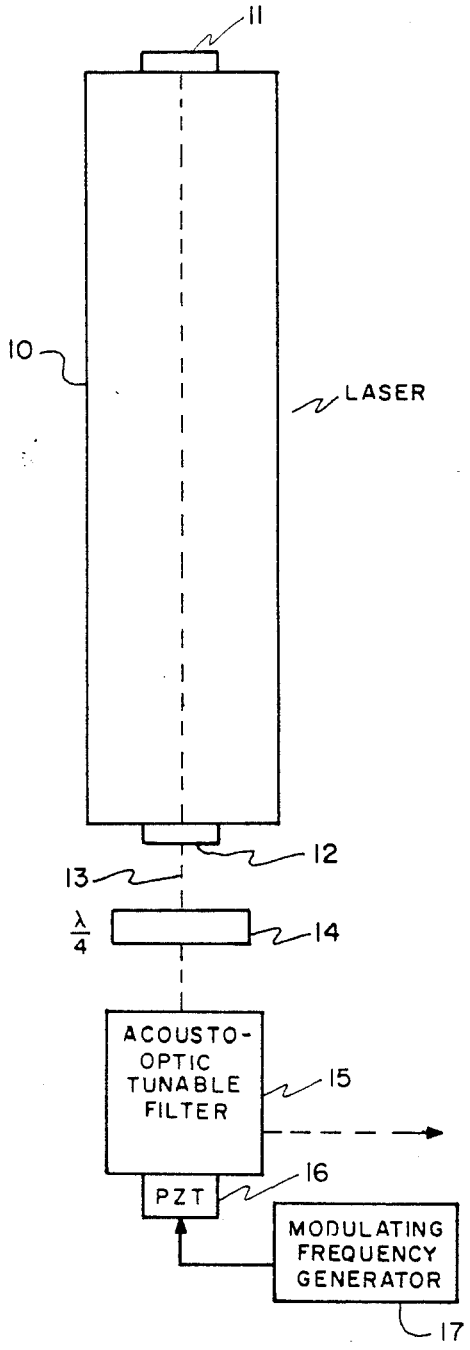
FIG. 1 is a schematic showing of one optical layout on which the invention may be practiced.

The method of the invention may be best understood if this description is taken in conjunction with the drawings. Referring now to FIG. 1, we see laser 10 with highly-reflective mirror 11 and output mirror 12, and with output beam 13 passing through quarter-wave plate 14 into acoustic-optical tunable filter (AOTF) 15. The quarter-wave plate imparts circular polarization to the linearly polarized beam 13. This is desirable because of the manner in which the AOTF operates. The AOTF is a known device disclosed in a SPIE paper entitled "Rapid Tuning Mechanism for $CO_2$ Lasers" by L. J. Denes, et al., at the SPIE O-E LASE '88 meeting in Los Angeles, CA in January 1988. This AOTF includes a crystal of thallium arsenic selenide (TAS), an internal reflector, and a piezo-electric transducer (PZT) for operating the device. This PZT, designated with reference numeral 16 in the drawing is fed an A.C. signal or voltage from a modulating frequency generator 17. Instead of acting as a tunable filter which it usually does, the externally located (with respect to laser cavity) AOTF acts as an amplitude modulator whenever 17 feeds an A.C. voltage to PZT 17. Depending upon the use to which the modulated laser beam is put, the output of 17 will be chosen. For example, if the beam is used for CW ranging, 17 will provide a highly-stable frequency in order that the phase the modulation envelope of the reflected beam power from a distant object may be compared with the phase of the output of 17. If the beam is used for communication, 17 vary in frequency as required.

Figure 2:
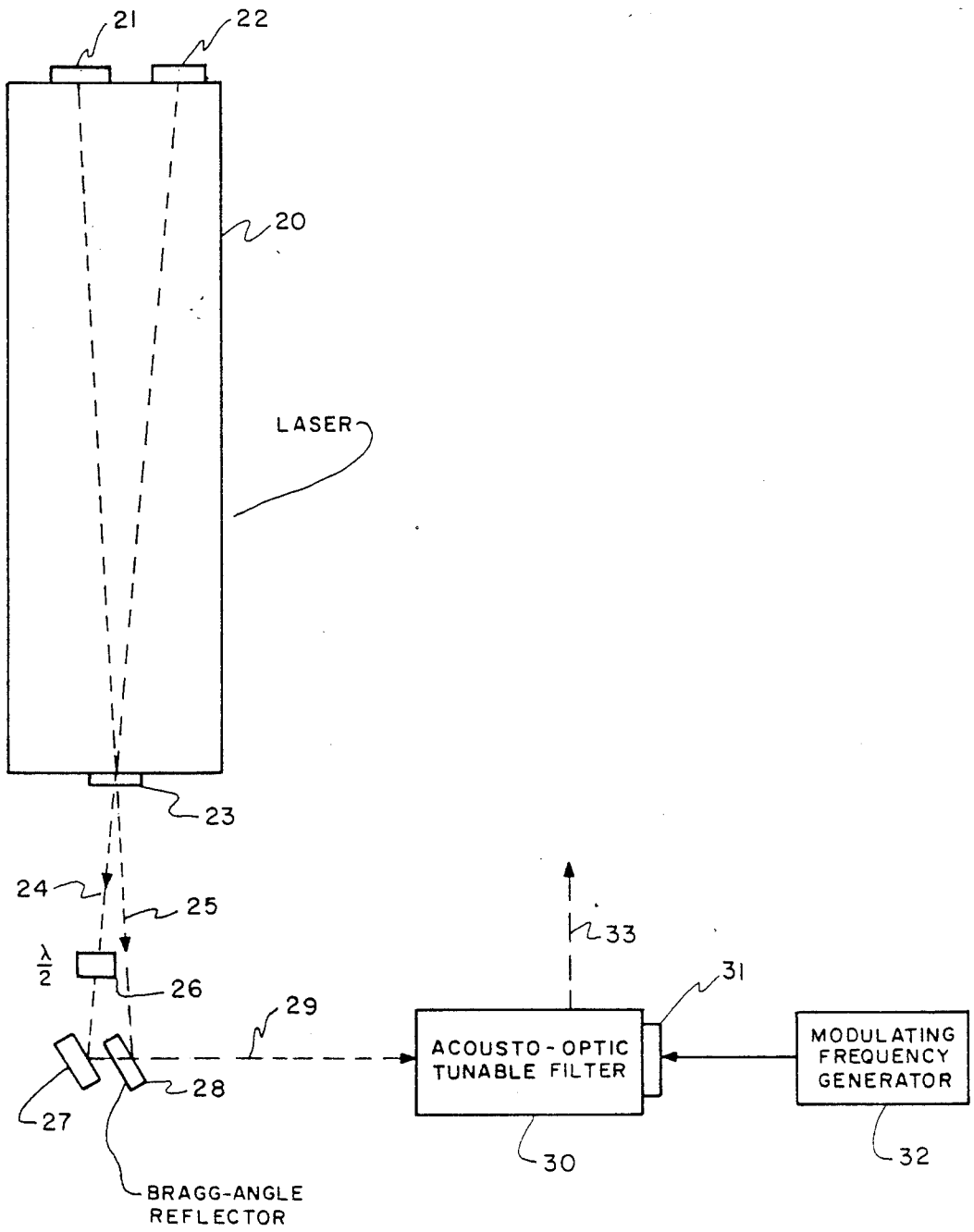
FIG. 2 is another schematic showing of an optical layout on which the invention may be practiced.

FIG. 2 shows laser 20 with highly reflective mirrors 21 and 22 output mirror 23. Output beam 24 passes through half-wave plate 26, is reflected by mirror 27 and passes through Bragg-angle reflector 28. Output beam 25 reflects from 28 and combined beam 29 enters AOTF 30. The 26-27-28 arrangement produces two orthogonal linear polarizations in beam 29. This insures proper AOTF AM operation. The AOTF 30 modulates input beam 29 under the action of PZT 31 fed by generator 32, to produce output beam 33.

The method of the invention is the new use of a well-known acoustic-optic tunable filter. Rather than use the filter for its normally intended purpose, it is used to amplitude modulate a laser beam. It is especially useful for high-powered lasers such as the $CO_2$ type. The method thus includes the steps of directing the laser beam into the AOTF, and applying an A.C. voltage to the PCT of the AOTF.

We claim:

1. A method of amplitude modulating a laser beam, including the steps of:

directing said laser beam into a colinear acousto-optic tunable filter including an anisotropic medium with a piezo-electric transducer affixed thereto; and applying an A.C. voltage to said transducer, whereby said laser is amplitude modulated to produce a modulation envelope in accordance with said A.C. voltage.

* * * * *